W. B. SHERMAN.
Measuring-Cans for Oil, &c.
No. 136,103.
Patented Feb. 18, 1873.
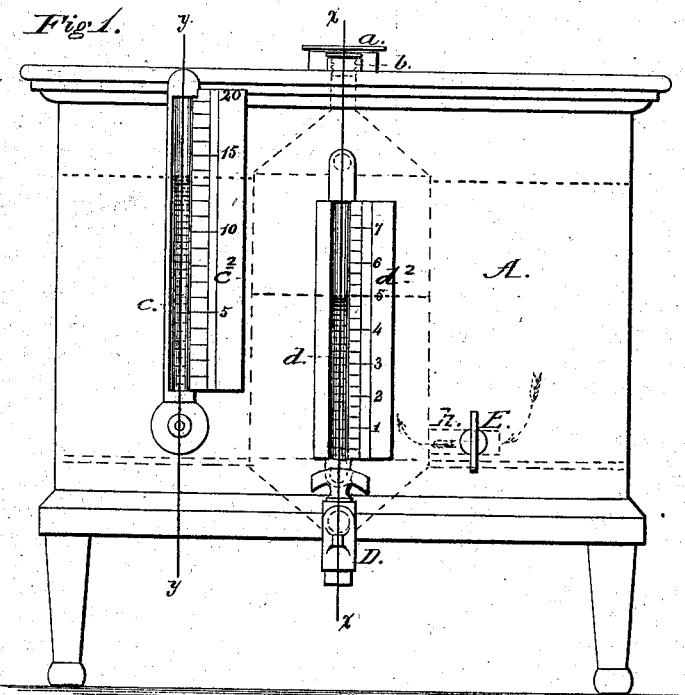
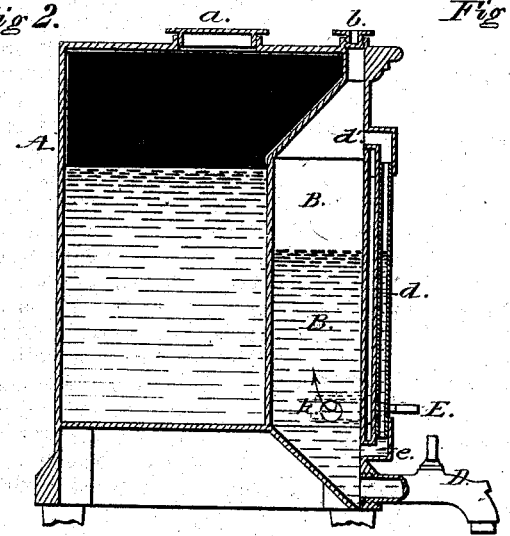
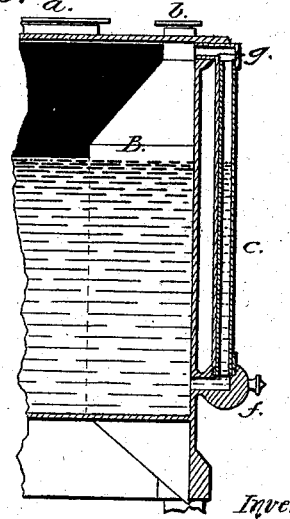

UNITED STATES PATENT OFFICE.

WARDELL B. SHERMAN, OF CLINTON, NEW YORK.

IMPROVEMENT IN MEASURING-CANS FOR OIL, &c.

Specification forming part of Letters Patent No. 136,103, dated February 18, 1873.

*To all whom it may concern:*

Be it known that WARDELL B. SHERMAN, of Clinton, in the county of Oneida and State of New York, respectfully represents that he has invented a new and useful Improvement in Cans for Measuring Oil and other Liquids; and I hereby declare that the following is a full, clear, and exact description of the same, reference being had to the accompanying drawing, with the letters of reference being marked thereon.

Similar letters of reference refer to corresponding parts in all figures.

The first part of my invention relates to a device arranged on the outside of any cask to indicate at all times the amount of liquid within, and consists of a tube of glass or other transparent material secured to the outside of a cask of any regular form or size, communicating with the elbow of a metallic tube at the top and bottom of said cask. The object of this is to conduct a part of the liquid from the inside of the cask, to show the level line of the liquid in the cask, and indicate by a scale on a plate alongside of the tube the exact contents of the cask at any time. The second part of my invention relates to a device for measuring small quantities of liquids drawn from the cask without the aid of any portable measure. In this part of my invention I employ a can of any regular form, which I place within a cask of any capacity to form a part of the same. Near the bottom of this can I run a metallic tube to the outside of the cask, which communicates with the glass tube secured in a metal plate, upon which is drawn a scale to indicate the given measure. At the bottom of the can is a cock, through which the liquid measured is drawn. A cock in the face of the vessel containing the liquid communicates with the vessel, and also the measuring-can. This cock, when turned in a certain direction, allows the liquid to pass into the can, the amount passing being shown by the scale graduated on the plate. At the top of the can is a vent to facilitate the filling and emptying of the can. There is a peculiarity in the measuring-can which should be mentioned, as measuring-cans have been invented somewhat similar to mine on general principles. This is in the form I give the bottom, in order that every particle of the liquid may be drawn from the can through the cock. The form is conical or funnel-shaped so as to allow no surface at the extreme bottom to hold a remainder of liquid not discharged by the cock.

Description of Drawing.

Figure 1 is a front elevation of my combined invention. Fig. 2 is a section on line $x\ x$, showing the relation the measuring device bears to the vessel. Fig. 3 is a section on line $z\ z$.

General Description.

A is the cask or vessel, of a rectangular or other regular form, made air-tight, and supported on legs to give it a neat and commodious appearance. In the top of this vessel is an opening, with a cap or cover. This opening serves as a vent for the cask, as well as a place to introduce a pipe to fill the same. $c$ is a glass tube which conducts a portion of the liquid in the vessel to the level of that contained in it. $c^2$ is a plate by the side of the glass tube $c$, on which is drawn a scale representing ten, fifteen, or twenty gallons. The level-line seen in the glass tube will always show the amount of liquid in the vessel. The glass tube $c$ is connected by the metallic elbow $g$ to the air-chamber of the main vessel. The cock E opens and closes the communication between the main vessel A and can B. B is a can, formed in the vessel A. This can has a vent, $b$, at its top. The tube $d$ is connected with the can at the top and bottom by metal elbows, opening into the can. The upper elbow $d$ opens into the air-chamber of the can, while the lower one, $e$, conducts a small portion of the liquid from the can B to the glass tube $d$. The liquid is conducted from the vessel to the can B by the small tube seen in Fig. 1, to which the cock E is attached. The cock D serves to discharge the contents of the can and vessel.

Having thus described my invention, its operation is as follows: The cover being removed, and the cocks E and D being closed, I proceed to fill the main vessel. As the liquid enters, its level will be shown on the tube $c$; the mark opposite or alongside will indicate the gallons, or fractions of the same, if necessary. When a given quantity is to be drawn from the main vessel, we open the cock E; the liquid follows in the direction of the arrows, and, as with the indicator of the main vessel, the quantity will be shown on the face of the plate $d^2$, in gallons or fractions of the same. The cock E is now closed, and the quantity measured can be drawn through the cock D. When it is desirable to employ the main vessel without measuring, both cocks should be opened, when the liquid will pass into the can, and thence out through the cock D.

Claim.

What I claim as new and my invention, and wish to secure by Letters Patent, is—

The combination of the device composed of the transparent tube $c$, with its communicating elbows $f$ and $g$, for indicating the quantity of liquid in the receiving-vessel, with the measuring device $d\ d^2$, and the cock D for indicating the quantity desired to be drawn, substantially as described and set forth.

WARDELL B. SHERMAN.

Witnesses:
 THEODORE AVERY,
 D. M. WHITE.